(12) United States Patent
Chao et al.

(10) Patent No.: US 8,059,197 B2
(45) Date of Patent: Nov. 15, 2011

(54) FIELD BALANCING DEVICE AND METHOD

(75) Inventors: Po-Wei Chao, Hsin-Tien (TW);
Ching-Hua Chang, Banciiao (TW);
Bing-Jhe Chen, Miao- Li Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 1243 days.

(21) Appl. No.: 11/737,763

(22) Filed: Apr. 20, 2007

(65) Prior Publication Data

US 2008/0094504 A1   Apr. 24, 2008

(30) Foreign Application Priority Data

Apr. 20, 2006   (TW) ................................ 95114097 A

(51) Int. Cl.
*H04N 7/01* (2006.01)
(52) U.S. Cl. ...................................................... 348/448
(58) Field of Classification Search ................... 348/448, 348/441, 678–679, 687–688, 645–651, 725
See application file for complete search history.

(56) References Cited

U.S. PATENT DOCUMENTS

| | | | |
|---|---|---|---|
| 4,551,753 A | | 11/1985 | Nishizawa |
| 5,561,474 A * | | 10/1996 | Kojima et al. ................. 348/653 |
| 5,606,373 A * | | 2/1997 | Dopp et al. .................... 348/459 |
| 5,689,301 A * | | 11/1997 | Christopher et al. ........... 348/97 |
| 6,823,083 B1 * | | 11/2004 | Watanabe et al. ............. 382/167 |
| 6,870,568 B1 | | 3/2005 | Hui |
| 7,110,046 B2 * | | 9/2006 | Lin et al. ........................ 348/679 |
| 7,176,977 B2 * | | 2/2007 | Zhu et al. ....................... 348/448 |
| 7,199,840 B2 * | | 4/2007 | Shiota ............................ 348/678 |
| 7,298,892 B2 * | | 11/2007 | Spaulding et al. ............. 382/167 |
| 7,391,468 B2 * | | 6/2008 | Shah .............................. 348/441 |
| 7,567,300 B2 * | | 7/2009 | Satou et al. .................... 348/609 |
| 7,589,765 B2 * | | 9/2009 | Kitajima .................... 348/227.1 |
| 7,768,681 B2 * | | 8/2010 | Kuwata ......................... 358/518 |
| 7,916,158 B2 * | | 3/2011 | Aoki et al. ..................... 345/690 |

FOREIGN PATENT DOCUMENTS

JP      4213283 A    8/1992
WO     0135636 A1   5/2001

* cited by examiner

*Primary Examiner* — Paulos Natnael
(74) *Attorney, Agent, or Firm* — Winston Hsu; Scott Margo

(57) ABSTRACT

A field balancing device for balancing the lightness/color of top fields and bottom fields of an interlaced signal includes: a detection circuit for detecting a lightness/color difference between at least one portion of at least one top field of the interlaced signal and at least one portion of at least one bottom field of the interlaced signal to generate a detection result; and a processing circuit, coupled to the detection circuit, for selectively processing at least one field of the interlaced signal according to the detection result to balance the lightness/color of top fields and bottom fields of the interlaced signal.

20 Claims, 9 Drawing Sheets

FIELD BALANCING DEVICE AND METHOD

BACKGROUND OF THE INVENTION

1. Field of the Invention

The present invention relates to de-interlacing processing, and more particularly, to field balancing devices and methods.

2. Description of the Prior Art

According to a prior art motion adaptive image processing method, when color differences exist between top fields and bottom fields of an interlaced signal, de-interlacing processing is performed directly. Typically, performing de-interlacing processing directly on the interlaced signal in this situation not only leads to sudden blinking around regions with motions in an image, but also leads to color variations around still image regions due to merging of the top and bottom fields.

SUMMARY OF THE INVENTION

It is therefore an objective of the claimed invention to provide field balancing devices and methods to balance the lightness/color of top fields and bottom fields of an interlaced signal.

It is another objective of the claimed invention to provide field balancing devices and methods to decrease or eliminate the lightness/color difference between top fields and bottom fields of an interlaced signal.

According to one embodiment of the claimed invention, a field balancing device for balancing the lightness/color of top fields and bottom fields of an interlaced signal is disclosed. The field balancing device comprises: a detection circuit for detecting a lightness/color difference between at least one portion of at least one top field of the interlaced signal and at least one portion of at least one bottom field of the interlaced signal to generate a detection result; and a processing circuit, coupled to the detection circuit, for selectively processing at least one field of the interlaced signal according to the detection result in order to balance the lightness/color of top fields and bottom fields of the interlaced signal.

According to one embodiment of the claimed invention, a field balancing method for balancing the lightness/color of top fields and bottom fields of an interlaced signal is disclosed. The field balancing method comprises: detecting a lightness/color difference between at least one portion of at least one top field of the interlaced signal and at least one portion of at least one bottom field of the interlaced signal to generate a detection result; and selectively processing at least one field of the interlaced signal according to the detection result to balance the lightness/color of top fields and bottom fields of the interlaced signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
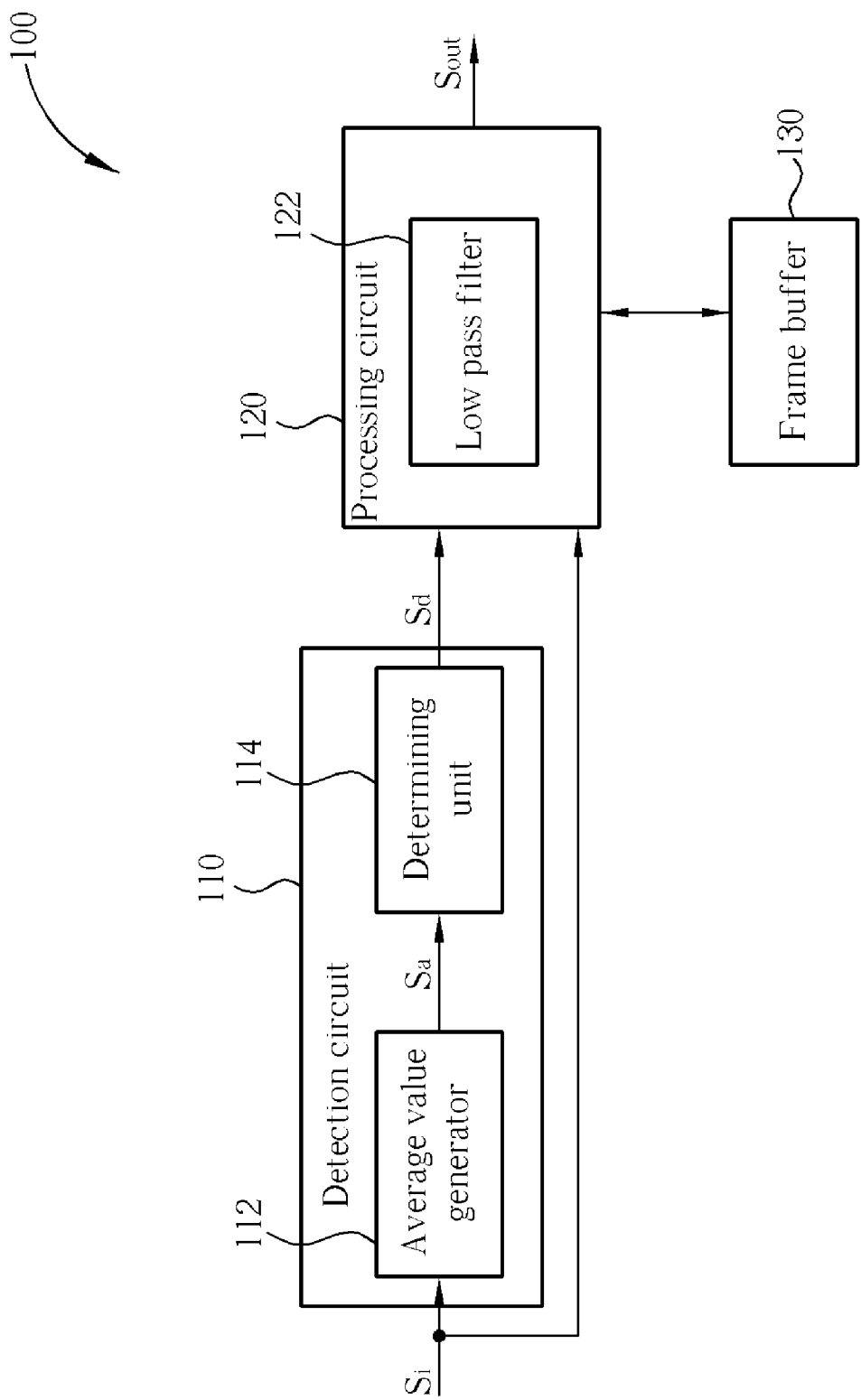
FIG. 1 is a diagram of a field balancing device according to one embodiment of the present invention.

Please refer to FIG. 1. FIG. 1 is a diagram of a field balancing device 100 according to one embodiment of the present invention. The field balancing device 100 is utilized for balancing the lightness/color of top fields and bottom fields of an interlaced signal Si. As shown in FIG. 1, the field balancing device 100 comprises a detection circuit 110 and a processing circuit 120, where the detection circuit 110 comprises an average value generator 112 and a determining unit 114, and the processing circuit 120 comprises a low pass filter 122.

Figure 2:
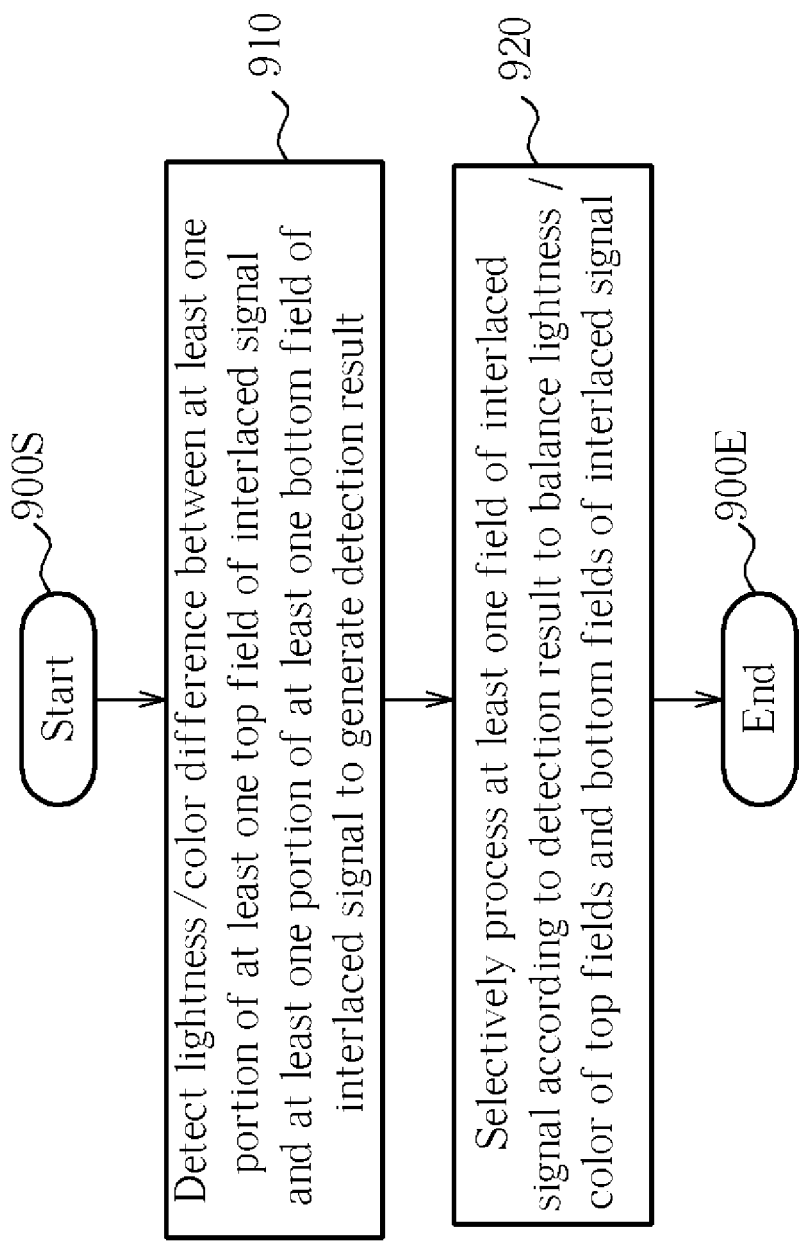
FIG. 2 is a flowchart of a field balancing method according to one embodiment of the present invention.

Please refer to FIG. 2. FIG. 2 is a flowchart of a field balancing method according to one embodiment of the present invention, where the field balancing method is utilized for balancing the lightness/color of top fields and bottom fields of an interlaced signal. The field balancing method is applicable to the embodiment shown in FIG. 1 or other embodiments disclosed in the following. According to the embodiment shown in FIG. 1, the field balancing method can be described as follows.

Step 910: The detection circuit 110 detects the lightness/color difference between at least one portion of at least one top field of the interlaced signal Si and at least one portion of at least one bottom field of the interlaced signal Si to generate a detection result Sd.

Step 920: The processing circuit 120 selectively processes at least one field of the interlaced signal Si according to the detection result Sd to balance the lightness/color of top fields and bottom fields of the interlaced signal Si.

According to an embodiment, the portion of the top field is a region of a size N by N pixels located within the top field, and the portion of the bottom field is a corresponding region of size N by N pixels located within the bottom field. For example, N can be equal to 3 or N can be equal to 5. According to another embodiment, the portion of the top field is a region of a size Nx by Ny pixels located within the top field, and the portion of the bottom field is a corresponding region of the size Nx by Ny pixels located within the bottom field. For example, Nx can be equal to 4 and Ny can be equal to 3. In another example, Nx can be equal to 720 and Ny can be equal to 240. For a picture of a size 720 by 480 pixels that is typically used in a Digital Versatile Disc (DVD), the situation where (Nx, Ny)=(720, 240) represents that the portion of the top field comprises all pixels within the top field, and the portion of the bottom field comprises all pixels within the bottom field. Various implementation choices such as those mentioned above can be selected for use according to characteristics of images represented by the interlaced signal Si. For example, the detection circuit 110 is capable of determining the size of region(s) to be selected within the image under detection (e.g. determining a larger size or a smaller size) according to the complexity degree of the content of the image, for generating the detection result Sd.

According to this embodiment, the average value generator 112 is capable of generating a plurality of average values respectively corresponding to a plurality of fields of the interlaced signal Si, and transmitting the plurality of average values to the determining unit 114 through the signal Sa. In addition, the determining unit 114 of this embodiment generates the detection result Sd according to the plurality of average values. Here, each average value is an average value of a plurality of pixel values of a plurality of pixels of a specific field within the plurality of fields, where the specific field can be a top field or a bottom field of the interlaced signal Si. In this embodiment, each average value is an average value of a plurality of luminance values of 3 by 3 pixels corresponding to the image center of a specific field within the plurality of fields, and the determining unit 114 is capable of calculating a difference value between two average values of the plurality of average values carried by the signal Sa, where the present invention is not limited to utilizing 3 by 3 pixels. According to different embodiments of the present invention, the difference value can be a difference value with a positive/negative sign or an absolute value (which can be derived from performing an absolute value operation on the difference value with the positive/negative sign), where the term "difference value" is utilized for all these embodiments in general without hindering the implementation of the present invention. In the embodiment shown in FIG. 1, the determining unit 114 is capable of deriving a difference value sequence comprising a plurality of difference values. According to some determining rule(s), the determining unit 114 of this embodiment may generate the corresponding detection result Sd. For example, regarding two difference values D-i and D-(i+1) among the plurality of difference values D-0, D-1, D-2, ..., etc. of the difference value sequence, the determining unit 114 compares the absolute value of the difference value D-i with a threshold value Th1 to determine whether the difference value D-i is greater than the threshold value Th1, compares the absolute value of the difference value D-(i+1) with a threshold value Th2 to determine whether the difference value D-(i+1) is greater than the threshold value Th2, and compares the absolute value |(D-i)-(D-(i+1))| of the difference value between the difference values D-i and D-(i+1) to determine whether the absolute value |(D-i)-(D-(i+1))| is less than a threshold value Th3, where if the three criteria mentioned above are satisfied, the determining unit 114 sets a flag F-i as 1 (which represents "true"); otherwise, the determining unit 114 sets the flag F-i as 0 (which represents "false"). By performing comparing operations on the plurality of difference values D-0, D-1, D-2, ..., etc., such as those mentioned above, the determining unit 114 may derive a flag sequence F comprising a plurality of flags F-0, F-1, F-2, ..., etc., where if continuous flags whose values are equal to 1 exist within the flag sequence F (e.g. five continuous flags), the detection result Sd generated by the determining unit 114 corresponds to a turn-on state; otherwise, the detection result Sd generated by the determining unit 114 corresponds to a turn-off state. As a result, the processing circuit 120 is capable of selectively processing at least one field of the interlaced signal Si according to the detection result Sd to balance the lightness/color of top fields and bottom fields of the interlaced signal Si.

The processing circuit 120 of this embodiment is capable of temporarily storing the top/bottom fields carried by the interlaced signal Si in the frame buffer 130, to combine a top field with a bottom field and convert them into a frame. According to this embodiment, the processing circuit 120 being capable of selectively processing at least one field of the interlaced signal Si means that the processing circuit 120 is capable of turning on or turning off the function of the low pass filter 122 according to whether the detection result Sd corresponds to the turn-on state or the turn-off state. As a result, the low pass filter 122 selectively low-pass filters the frame derived from the frame buffer 130 according to the detection result Sd. If the detection result Sd corresponds to the turn-on state, the processing circuit 120 outputs the low-pass filtered frame through an output signal Sout, where the output signal Sout of this embodiment is a progressive scan signal. Conversely, if the detection result Sd corresponds to the turn-off state, the processing circuit 120 directly outputs the frame, which has not been low-pass filtered, through the output signal Sout. It is noted that although the output signal Sout of this embodiment is implemented with a progressive scan signal, this is not a limitation of the present invention. According to another embodiment of the present invention, the output signal Sout can be implemented with an interlaced signal.

Figure 3:
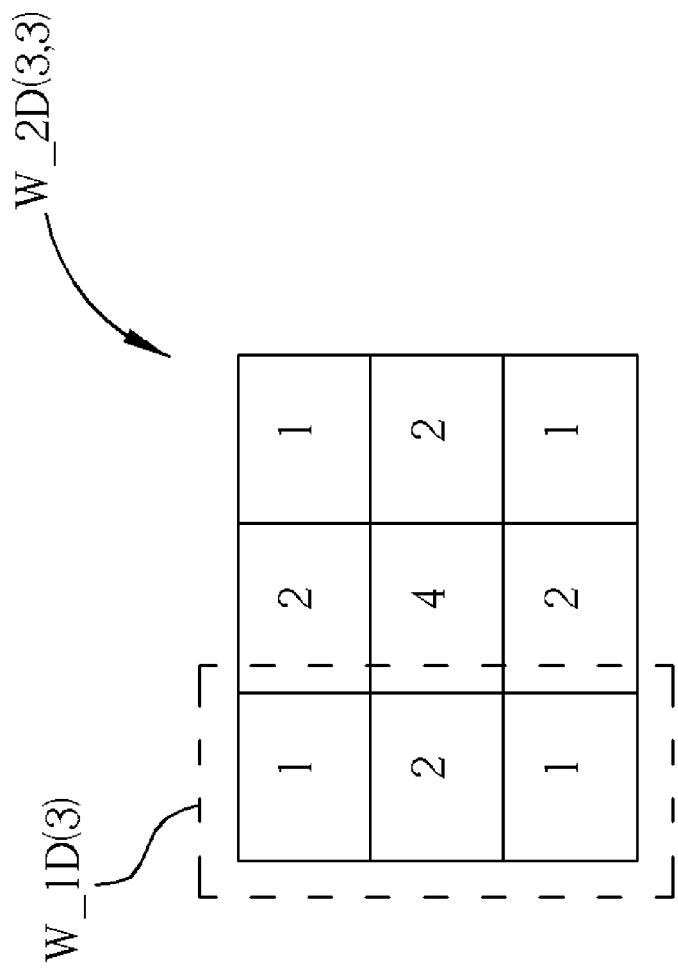
FIG. 3 illustrates a weighted value array applicable to the low pass filter shown in FIG. 1.

When the detection result Sd corresponds to the turn-on state, the low pass filter 122 of this embodiment is capable of performing two-dimensional low-pass filtering on the frame that the processing circuit 120 is going to process, or performing any low-pass filtering of one or more dimensions on the frame. As shown in FIG. 3, the low pass filter 122 may utilize the weighted value array W_2D (3, 3) to perform a weighted average operation on pixel values of a plurality of pixels within the frame, to generate the low-pass filtered pixel value of the pixel corresponding to the location of the weighted value 4. As a result, according to the detection performed by the detection circuit 110 and the selective processing performed by the processing circuit 120, the field balancing device 100 may balance the lightness/color of top fields and bottom fields of the interlaced signal Si.

According to this embodiment, as long as the storage capacity of the frame buffer 130 is large enough, the fields selectively processed by the processing circuit 120 may comprise the field that is initially detected by the detection circuit 110. Thus, by the selective filtering mentioned above, the processing circuit 120 may also decrease the lightness/color difference between top fields and bottom fields within the fields that have been detected by the detection circuit 110.

It is noted that, according to some embodiments of the present invention, the top fields or bottom fields processed by the processing circuit 120 are not necessarily the fields that have been detected by the detection circuit 110. That is, the processing circuit 120 of these embodiments may decrease the lightness/color difference between at least one portion of at least one field of the interlaced signal Si and at least one portion of another field of the interlaced signal Si to balance the lightness/color of top fields and bottom fields of the interlaced signal Si. However, as long as the storage capacity of the frame buffer 130 is large enough, the top or bottom fields processed by the processing circuit 120 can be the fields that have been detected by the detection circuit 110. That is, the processing circuit 120 may decrease the lightness/color difference between at least one portion of the top field detected by the detection circuit 110 and at least one portion of the bottom field detected by the detection circuit 110, to balance the lightness/color of top fields and bottom fields of the interlaced signal Si.

In addition, the present invention is not limited to balancing the lightness/color of top fields and bottom fields of the interlaced signal Si by only decreasing the lightness/color difference between the top and bottom fields of the same frame within the interlaced signal Si. According to some embodiments of the present invention, the goal of balancing the lightness/color of top fields and bottom fields of the interlaced signal Si can also be achieved by decreasing the lightness/color difference between the bottom field of a certain frame and the top field of the next frame within the interlaced signal Si.

According to a variation of the embodiment shown in FIG. 1, the frame buffer 130 can be replaced with a line buffer, where the variation corresponds to a simplified implementation method. According to this variation, the storage capacity of the line buffer can be determined according to operation requirements of the processing unit 120. For example, regarding the size of the weighted value array W_2D (3, 3) mentioned above, a 3-line buffer is typically capable of supporting the filtering function mentioned above. According to this variation, as the storage capacity of the line buffer is limited, the field selectively processed by the processing circuit 120 may not comprise the field that is initially detected by the detection circuit 110. Therefore, in this variation, before the processing circuit 120 turns on the filtering processing, the field that is initially detected by the detection circuit 110 should be combined with another field (so that the fields are converted into a frame) and output through the output signal Sout.

According to another variation of the embodiment shown in FIG. 1, the low pass filter 122 is capable of performing one-dimensional low-pass filtering on a frame that the processing circuit 120 is going to process. As shown in FIG. 3, the low pass filter 122 utilizes the weighted value array W_1D (3) to perform a weighted average operation on pixel values of a plurality of pixels within the frame, to generate the low-pass filtered pixel value of the pixel corresponding to the location of the weighted value 2 of the weighted value array W_1D (3).

According to another variation of the embodiment shown in FIG. 1, the low pass filter 122 is capable of performing one-dimensional low-pass filtering on a frame that the processing circuit 120 is going to process, where the one-dimensional low-pass filtering is an average operation performed on pixel values of two adjacent pixels along a vertical direction within the frame. This variation substantially replaces the weighted value array W_1D (3) mentioned above with another weighted value array W_1D (2), where the weighted value array W_1D (2) has two vertically arranged weighted values, which are both equal to 1.

Figure 4:
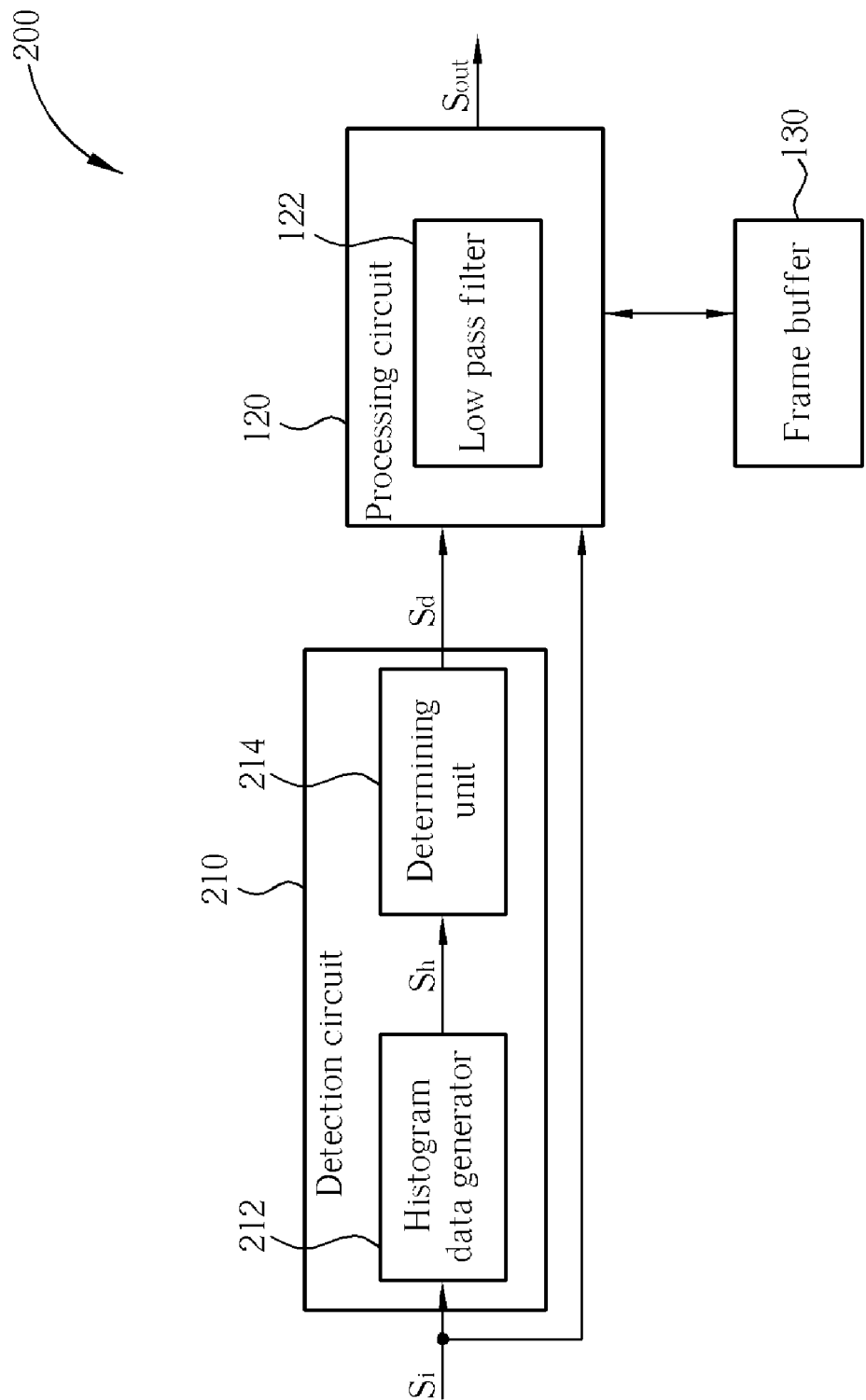
FIG. 4 is a diagram of a field balancing device according to one embodiment of the present invention.

FIG. 4 is a diagram of a field balancing device 200 according to another embodiment of the present invention, where this embodiment is a variation of the embodiment shown in FIG. 1. In addition to the processing circuit 120 and the frame buffer 130 mentioned above, the field balancing device 200 further comprises a detection circuit 210, where the detection circuit 210 comprises a histogram data generator 212 and a determining unit 214. The histogram data generator 212 is capable of generating a plurality of histogram data sets H-1, H-2, H-3, . . . , etc. respectively corresponding to a plurality of fields of the interlaced signal Si, where each histogram data set H-i is a histogram of a plurality of pixel values of a plurality of pixels of a specific field of the plurality of fields. Similarly, the specific field can be a top field or a bottom field of the interlaced signal Si. According to this embodiment, each histogram data set H-i is a histogram of a plurality of gray levels of all the pixels corresponding to the whole picture within a specific field of the plurality of fields.

Figure 5:
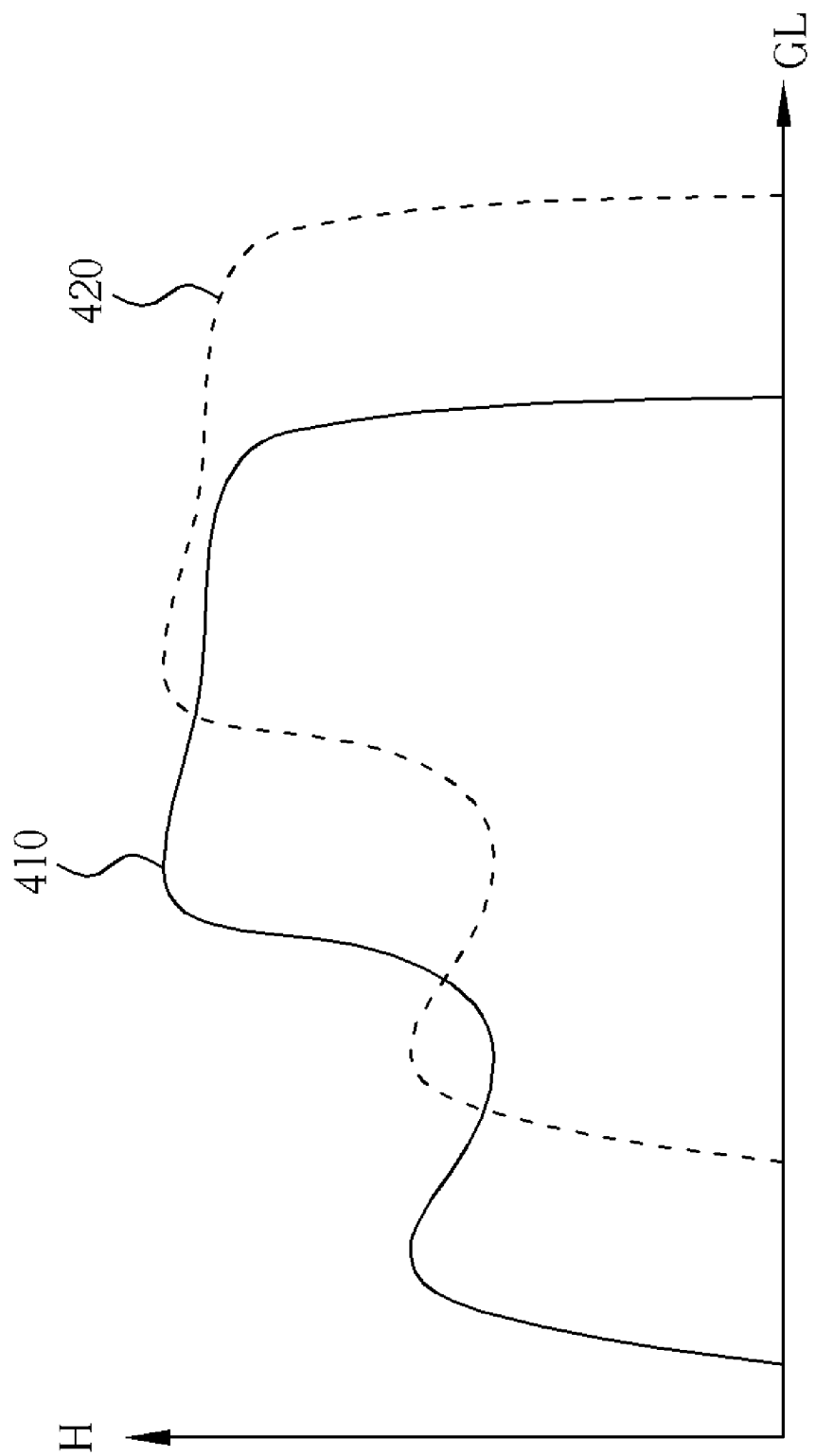
FIG. 5 illustrates histogram curves corresponding to a plurality of histogram data sets that may be generated by the histogram data generator shown in FIG. 4.

In addition, the determining unit 214 is capable of generating the detection result Sd according to the plurality of histogram data sets H-1, H-2, H-3, . . . , etc. outputted by the histogram data generator 212 through the signal Sh. Similarly, according to some determining rule(s), the determining unit 214 may generate the corresponding detection result Sd. For example, if histogram curves C-1, C-2, C-3, . . . , etc. respectively correspond to a plurality of histogram data sets H-1, H-2, H-3, . . . , etc., and there are some histogram curves C-i, C-(i+2), C-(i+4), . . . , etc. having similar distribution such as the curve 410 shown in FIG. 5 and some histogram curves C-(i+1), C-(i+3), C-(i+5), . . . , etc. having similar distribution such as the curve 420 shown in FIG. 5, and the curve 420 is substantially a shifted version of the curve 410, the detection result Sd generated by the determining unit 214 corresponds to a turn-on state; otherwise, the detection result Sd generated by the determining unit 214 corresponds to a turn-off state. Similar descriptions are not repeated for this embodiment.

Figure 6:
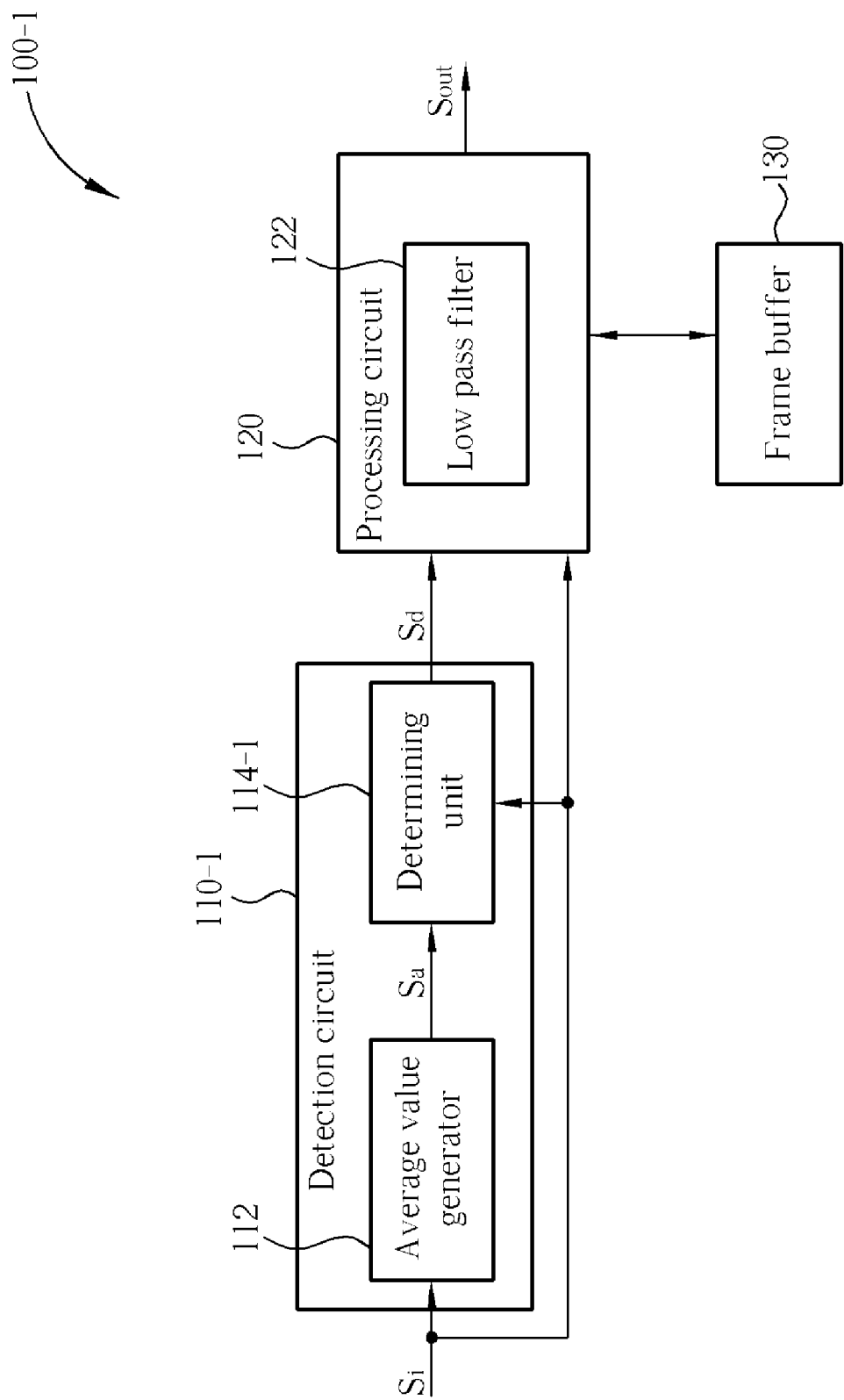
FIG. 6 is a diagram of a field balancing device according to one embodiment of the present invention.

FIG. 6 is a diagram of a field balancing device 100-1 according to one embodiment of the present invention, where this embodiment is a variation of the embodiment shown in FIG. 1. In contrast to the field balancing device 100, the determining unit 114-1 of the detection circuit 110-1 within the field balancing device 100-1 further detects an image pattern of the interlaced signal Si by performing exclusive processing in advance. Thus, when the image pattern appears in the interlaced signal Si, the exclusive processing makes the detection result Sd generated by the determining unit 114-1 correspond to the turn-off state. Similar descriptions are not repeated for this embodiment.

In a variation of this embodiment, the average value generator 112 and the determining unit 114-1 of the detection circuit 110-1 mentioned above can be respectively replaced with the histogram data generator 212 shown in FIG. 4 and another determining unit 214-1, where the determining unit 214-1 is modified from the determining unit 214 shown in FIG. 4, so as to have the function of detecting the image pattern of the interlaced signal Si as mentioned above in order to perform the exclusive processing. Similar descriptions are not repeated for this variation.

Figure 7:
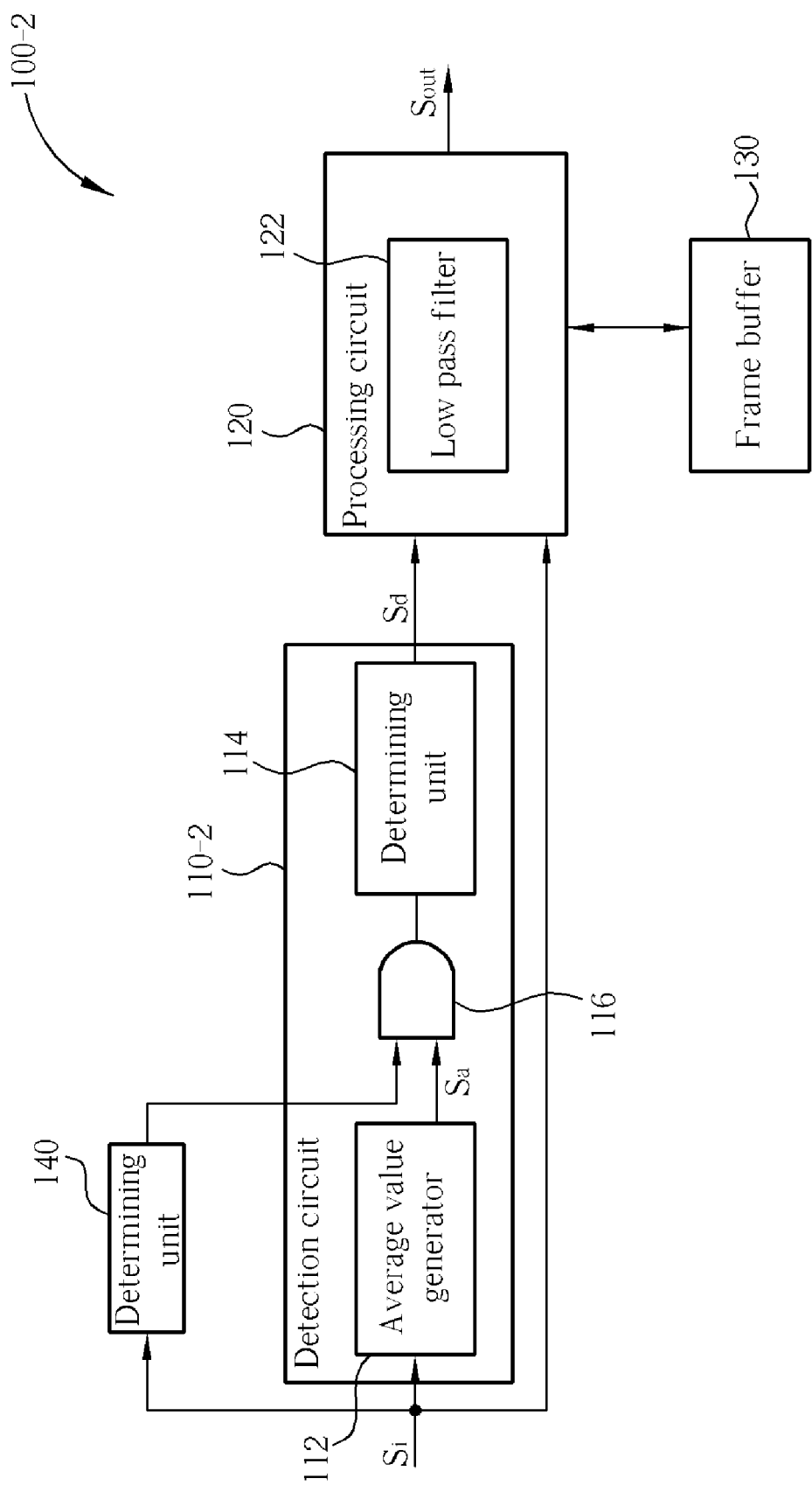
FIG. 7 is a diagram of a field balancing device according to one embodiment of the present invention.

FIG. 7 is a diagram of a field balancing device 100-2 according to one embodiment of the present invention, where this embodiment is also a variation of the embodiment shown in FIG. 1. In contrast to the field balancing device 100, the detection circuit 110-2 within the field balancing device 100-2 further comprises an AND gate 116, coupled between the average value generator 112 and the determining unit 114, and the field balancing device 100-2 further comprises a determining unit 140 for detecting the image pattern of the interlaced signal Si to perform the exclusive processing in advance. Thus, by utilizing the architecture shown in FIG. 7, when the image pattern appears in the interlaced signal Si, the exclusive processing makes the detection result Sd generated by the determining unit 114 correspond to the turn-off state. Similar descriptions are not repeated for this embodiment.

In a variation of this embodiment, the average value generator 112 and the determining unit 114 of the detection circuit 110-2 mentioned above can be respectively replaced with the histogram data generator 212 shown in FIG. 4 and the determining unit 214. Similar descriptions are not repeated for this variation.

Figure 8:
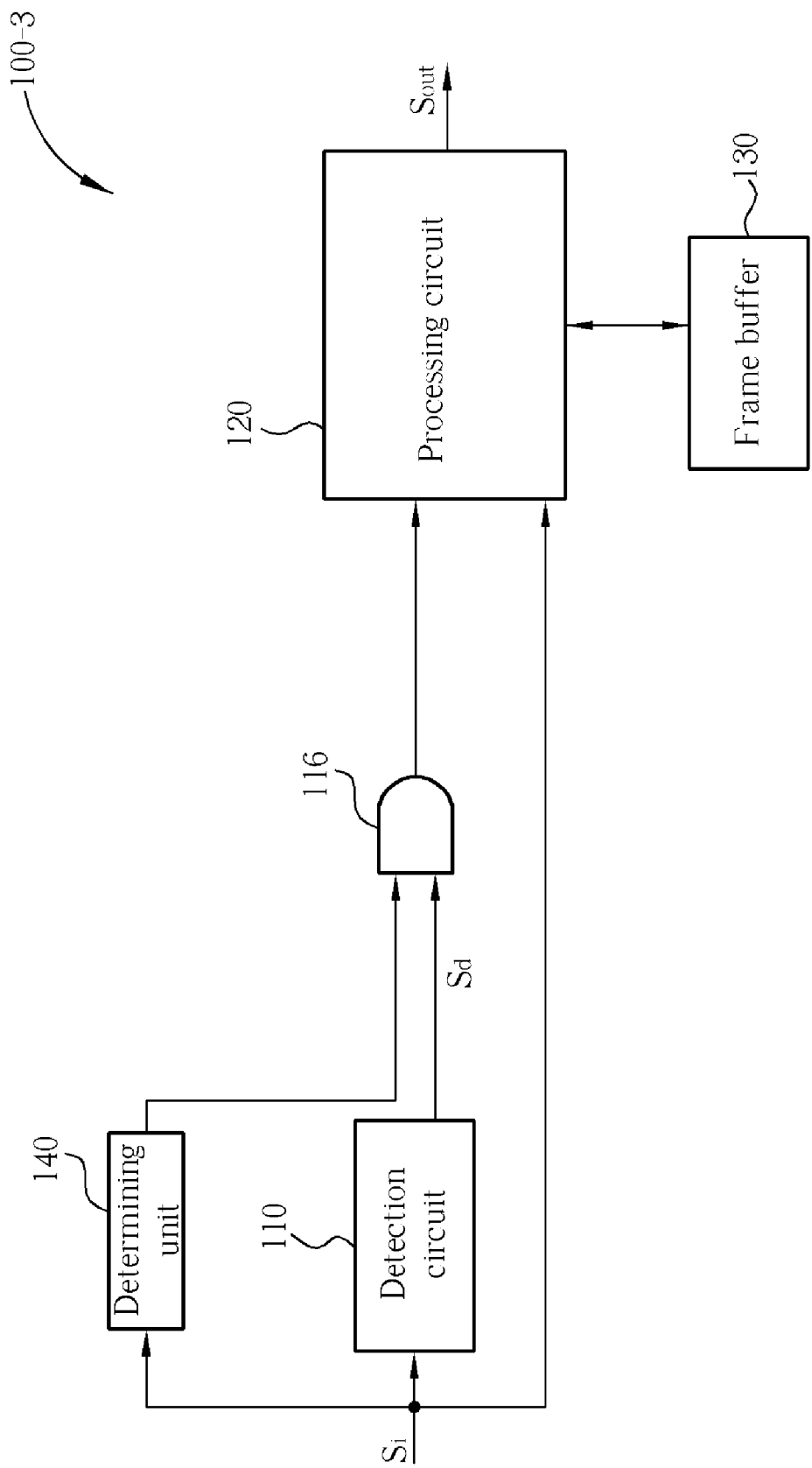
FIG. 8 is a diagram of a field balancing device according to one embodiment of the present invention.

FIG. 8 is a diagram of a field balancing device 100-3 according to one embodiment of the present invention, where this embodiment is also a variation of the embodiment shown in FIG. 1. In contrast to the field balancing device 100, the field balancing device 100-3 further comprises the AND gate 116, coupled between the detection circuit 110 and the processing circuit 120, and the field balancing device 100-3 further comprises the determining unit 140 for detecting the image pattern of the interlaced signal Si in order to perform the exclusive processing in advance. Thus, by utilizing the architecture shown in FIG. 8, when the image pattern does not appear in the interlaced signal Si, the state corresponding to the output of the AND gate 116 is substantially equivalent to the state corresponding to the detection result Sd (e.g. the turn-on state or the turn-off state). When the image pattern appears in the interlaced signal Si, regardless of whether the detection result Sd generated by the determining unit 114 in the detection circuit 110 corresponds to the turn-off state, the exclusive processing makes the output of the AND gate 116 correspond to the turn-off state. Similar descriptions are not repeated for this embodiment.

In a variation of this embodiment, the detection circuit 110 within the field balancing device 100-3 mentioned above can be replaced with the detection circuit 210 shown in FIG. 4. Similar descriptions are not repeated for this variation.

Figure 9:
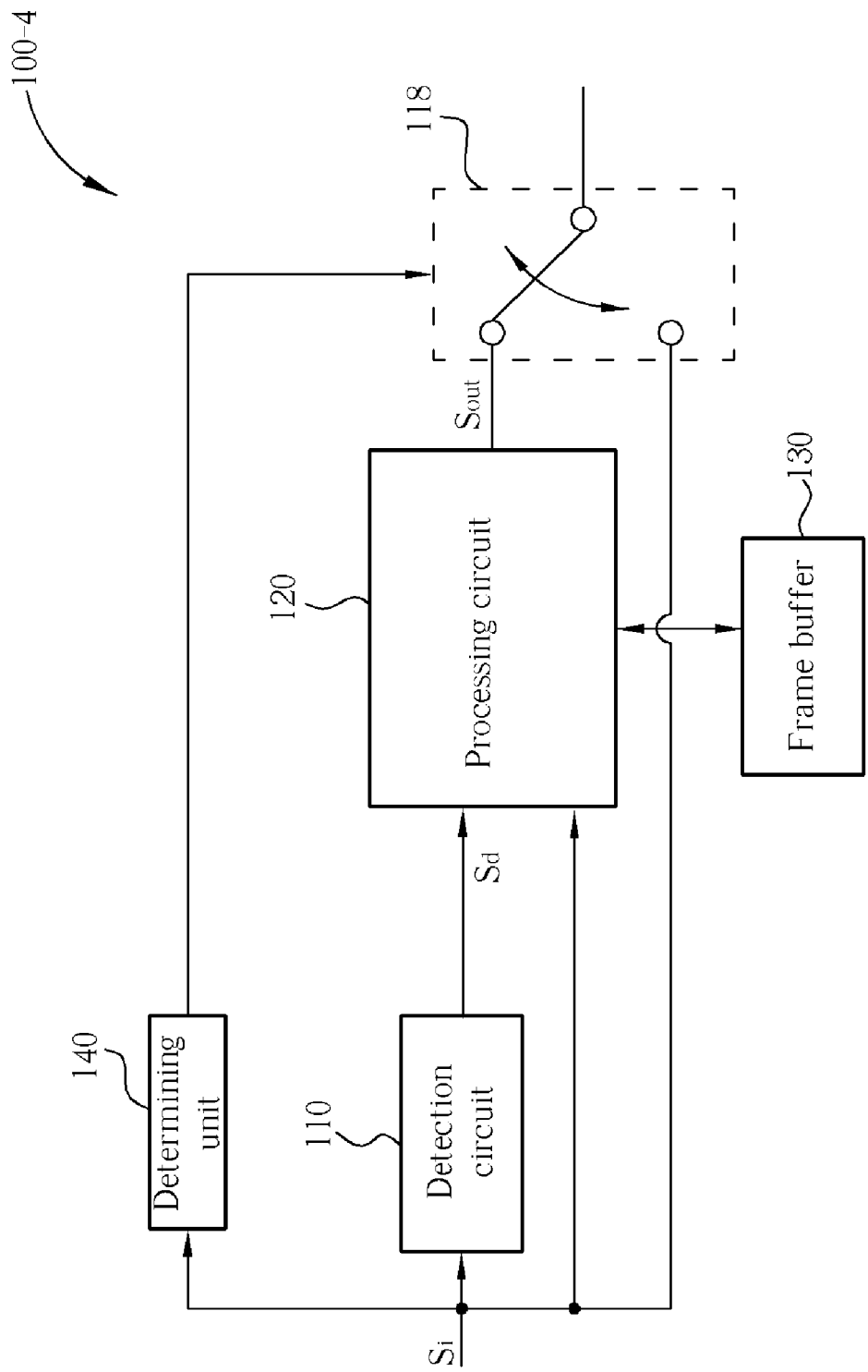
FIG. 9 is a diagram of a field balancing device according to one embodiment of the present invention.

FIG. 9 is a diagram of a field balancing device 100-4 according to one embodiment of the present invention, where this embodiment is also a variation of the embodiment shown in FIG. 1. In contrast to the field balancing device 100, the field balancing device 100-4 further comprises the determining unit 140 for detecting the image pattern of the interlaced signal Si for performing the exclusive processing in advance, and the field balancing device 100-4 further comprises a switch 118 for selecting one of the output signal Sout and the interlaced signal Si as the output of the field balancing device 100-4 according to the output of the determining unit 140, where the output signal Sout of this embodiment is implemented with an interlaced signal. Thus, by utilizing the architecture shown in FIG. 9, when the image pattern appears in the interlaced signal Si, the exclusive processing makes the switch 118 select the interlaced signal Si as the output of the field balancing device 100-4. Similar descriptions are not repeated for this embodiment.

In a variation of this embodiment, the detection circuit 110 within the field balancing device 100-4 mentioned above can be replaced with the detection circuit 210 shown in FIG. 4. Similar descriptions are not repeated for this variation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A field balancing device for balancing the lightness/color of top fields and bottom fields of an interlaced signal, the field balancing device comprising:
   a detection circuit for detecting a lightness/color difference between at least one portion of at least one top field of the interlaced signal and at least one portion of at least one bottom field of the interlaced signal to generate a detection result, wherein the detection circuit comprises:
      an average value generator for generating a plurality of average values respectively corresponding to a plurality of fields of the interlaced signal, wherein each average value is an average of a plurality of pixel values of a specific field of the plurality of fields, and the specific field is a top field or a bottom field of the interlaced signal; and
      a determining unit, coupled to the average value generator, for generating the detection result according to the plurality of average values; and
   a processing circuit, coupled to the detection circuit, for selectively processing at least one field of the interlaced signal according to the detection result to balance the lightness/color of top fields and bottom fields of the interlaced signal.

2. A field balancing device for balancing the lightness/color of top fields and bottom fields of an interlaced signal, the field balancing device comprising:
   a detection circuit for detecting a lightness/color difference between at least one portion of at least one top field of the interlaced signal and at least one portion of at least one bottom field of the interlaced signal to generate a detection result, wherein the detection circuit comprises:
      a histogram data generator for generating a plurality of histogram data sets respectively corresponding to a plurality of fields of the interlaced signal, wherein each histogram data set is a histogram of a plurality of pixel values of a specific field of the plurality of fields, and the specific field is a top field or a bottom field of the interlaced signal; and
      a determining unit, coupled to the histogram data generator, for generating the detection result according to the plurality of histogram data sets; and
   a processing circuit, coupled to the detection circuit, for selectively processing at least one field of the interlaced signal according to the detection result to balance the lightness/color of top fields and bottom fields of the interlaced signal.

3. The field balancing device of claim 1 or 2, wherein the determining unit further detects an image pattern of the interlaced signal to perform exclusive processing in advance.

4. The field balancing device of claim 1 or 2, wherein the processing circuit comprises:
   a low pass filter for selectively low-pass filtering a frame composed of a top field and a bottom field of the interlaced signal according to the detection result.

5. The field balancing device of claim 4, wherein the low pass filter is capable of performing one-dimensional low-pass filtering on the frame.

6. The field balancing device of claim 5, wherein the one-dimensional low-pass filtering is an average operation performed on pixel values of two adjacent pixels along a vertical direction within the frame.

7. The field balancing device of claim 4, wherein the low pass filter is capable of performing two-dimensional low-pass filtering on the frame.

8. The field balancing device of claim 1 or 2, wherein the at least one field selectively processed by the processing circuit comprises the at least one top field or the at least one bottom field detected by the detection circuit, and the field balancing device further comprises:
   a frame buffer, coupled to the detection circuit and the processing circuit, for temporarily storing the at least one top field or the at least one bottom field detected by the detection circuit.

9. The field balancing device of claim 8, wherein the processing circuit decreases the lightness/color difference between the at least one portion of the at least one top field and the at least one portion of the at least one bottom field to balance the lightness/color of top fields and bottom fields of the interlaced signal.

10. The field balancing device of claim 1 or 2, wherein the processing circuit decreases the lightness/color difference between at least one portion of the at least one field and at least one portion of another field of the interlaced signal to balance the lightness/color of top fields and bottom fields of the interlaced signal.

11. A field balancing method for balancing the lightness/color of top fields and bottom fields of an interlaced signal, the field balancing method comprising:
   detecting a lightness/color difference between at least one portion of at least one top field of the interlaced signal and at least one portion of at least one bottom field of the interlaced signal to generate a detection result, wherein the detecting step further comprises:

generating a plurality of average values respectively corresponding to a plurality of fields of the interlaced signal, wherein each average value is an average of a plurality of pixel values of a specific field of the plurality of fields, and the specific field is a top field or a bottom field of the interlaced signal; and generating the detection result according to the plurality of average values; and selectively processing at least one field of the interlaced signal according to the detection result to balance the lightness/color of top fields and bottom fields of the interlaced signal.

12. A field balancing method for balancing the lightness/color of top fields and bottom fields of an interlaced signal, the field balancing method comprising:

detecting a lightness/color difference between at least one portion of at least one top field of the interlaced signal and at least one portion of at least one bottom field of the interlaced signal to generate a detection result, wherein the detecting step further comprises:

generating a plurality of histogram data sets respectively corresponding to a plurality of fields of the interlaced signal, wherein each histogram data set is a histogram of a plurality of pixel values of a specific field of the plurality of fields, and the specific field is a top field or a bottom field of the interlaced signal; and generating the detection result according to the plurality of histogram data sets; and selectively processing at least one field of the interlaced signal according to the detection result to balance the lightness/color of top fields and bottom fields of the interlaced signal.

13. The field balancing method of claim 11 or 12, wherein the processing step further comprises:

selectively low-pass filtering a frame composed of a top field and a bottom field of the interlaced signal according to the detection result.

14. The field balancing method of claim 13, wherein the processing step further comprises:

selectively performing one-dimensional low-pass filtering on the frame according to the detection result.

15. The field balancing method of claim 14, wherein the one-dimensional low-pass filtering is an average operation performed on pixel values of two adjacent pixels along a vertical direction within the frame.

16. The field balancing method of claim 13, wherein the processing step further comprises:

selectively performing two-dimensional low-pass filtering on the frame according to the detection result.

17. The field balancing method of claim 11 or 12, wherein the at least one field selectively processed by the selectively processing step comprises the at least one top field or the at least one bottom field detected by the detecting step, and the field balancing method further comprises:

temporarily storing the at least one top field or the at least one bottom field detected by the detecting step.

18. The field balancing method of claim 17, wherein the selectively processing step further comprises:

decreasing the lightness/color difference between the at least one portion of the at least one top field and the at least one portion of the at least one bottom field to balance the lightness/color of top fields and bottom fields of the interlaced signal.

19. The field balancing method of claim 11 or 12, wherein the selectively processing step further comprises:

decreasing the lightness/color difference between at least one portion of the at least one field and at least one portion of another field of the interlaced signal to balance the lightness/color of top fields and bottom fields of the interlaced signal.

20. The field balancing method of claim 11 or 12, further comprising a step for detecting an image pattern of the interlaced signal to perform exclusive processing in advance.

* * * * *